United States Patent
Majid et al.

[11] Patent Number: 6,154,375
[45] Date of Patent: Nov. 28, 2000

[54] SOFT START SCHEME FOR RESONANT CONVERTERS HAVING VARIABLE FREQUENCY CONTROL

[75] Inventors: Naveed Majid, Mohegan Lake, N.Y.; Fernand Raphael Cornelis Antheunes; Jerzy Janczak, both of Eindhoven, Netherlands

[73] Assignee: Philips Electronics North America Corporation, New York, N.Y.

[21] Appl. No.: 09/415,160

[22] Filed: Oct. 8, 1999

[51] Int. Cl.⁷ .......................... H02M 3/335; H02M 7/517
[52] U.S. Cl. .................. 363/16; 363/49; 323/901
[58] Field of Search .................. 363/16, 17, 20, 363/21, 56, 49, 58, 95, 97, 98, 131; 323/901, 902

[56] References Cited

U.S. PATENT DOCUMENTS

| | | | |
|---|---|---|---|
| 4,992,919 | 2/1991 | Lee et al. | 363/17 |
| 5,084,811 | 1/1992 | Maige et al. | 363/49 |
| 5,293,308 | 3/1994 | Boys et al. | 363/37 |
| 5,612,860 | 3/1997 | Meszlenyi | 363/49 |
| 5,767,744 | 6/1998 | Irwin et al. | 330/297 |
| 5,777,864 | 7/1998 | Seong et al. | 363/98 |
| 5,912,812 | 6/1999 | Moriarty, Jr. | 363/89 |
| 6,018,467 | 1/2000 | Majid et al. | 363/16 |

*Primary Examiner*—Adolf Deneke Berhane
*Attorney, Agent, or Firm*—Edward W. Goodman

[57] ABSTRACT

A resonant mode power supply includes a soft-start circuit for, at start-up, for sweeping the frequency of the power supply from a maximum value to a minimum value. The soft-start circuit performs this frequency sweep using the function $$F(x) = 1 - e^{-t}$$

Using this function, change in the frequency, and correspondingly the increase of the output voltage decreases over time, thereby allowing a feedback circuit of the resonant mode power supply to respond to the level of the output voltage and to begin regulation when the output voltage achieves the desired regulation level. As such, overshoot of the output voltage with respect to the regulation level is lessened, if not eliminated.

5 Claims, 6 Drawing Sheets

SOFT START SCHEME FOR RESONANT CONVERTERS HAVING VARIABLE FREQUENCY CONTROL

BACKGROUND OF THE INVENTION

1. Field of the Invention

The subject invention relates to resonant mode power supplies for, e.g., television receivers, and more particularly, to the start up of such resonant mode power supplies.

2. Description of the Related Art

Television receivers include power supplies for supplying power to the various circuit components. Generally, these power supplies are in the form of switched-mode power supplies in which a d.c. voltage is applied to one end of a primary winding of a flyback transformer. The other end of the primary winding is connected to ground through a switching element which is controlled to switch on and off at a determined frequency. The switched power to the transformer is then transferred to the secondary winding for providing the output power.

It has been found that resonant mode power supplies have higher efficiencies and are especially suited for power levels higher than 150W and for power supplies that need to be miniaturized, e.g., power supplies for battery charging. In a resonant mode power supply, an oscillating circuit, which is typically a series oscillating circuit, is supplied through a first switching element with a direct voltage by which the oscillating circuit is excited. After one-half of an oscillating period, the first switching element is opened, and the oscillating circuit is connected to ground through a second switching element, and as a result, the capacitor of the oscillating circuit discharges, and the oscillation is thus continued. An oscillation can accordingly be excited by alternatively opening and closing the switching elements. The output power delivered by a resonant mode power supply is inversely proportional to the oscillation frequency, i.e., the lower the frequency, the higher the output power.

It is customary to configure a resonant mode power supply such that starts up with a soft-start sequence. This is accomplished by arranging the resonant mode power supply, on start-up, to perform a frequency sweep from its maximum value to its minimum value. By sweeping the frequency from the maximum to minimum value, the current delivered to the converter is swept from its minimum value to the maximum peak value. This is done to reduce stress on the system components.

Traditionally, the frequency sweep is performed in a linear fashion using a ramp function. The resonant mode power supply includes a feedback circuit, which generally consists of an opto-controller driven by a capacitor, for controlling the output voltage. As such, this feedback circuit has a slow response time. This results in a large overshoot of the output voltage on start-up before the feedback circuit is able to regulate the output voltage to the desired regulation level. FIG. 1 shows this start-up overshoot behavior. In resonant circuits, due to the larger gain of the circuit close to its operating point (see FIG. 2), this overshoot can be even higher than in a flyback-based power supply.

SUMMARY OF THE INVENTION

It is an object of the present invention to reduce the overshoot on the output voltage.

This object is achieved in a resonant mode power supply comprising means for generating a d.c. supply voltage having a first terminal and a second terminal; a first switching element having a first terminal coupled to said first terminal of said generating means, and a second terminal connected to a supply node; a second switching element having a first terminal coupled to said supply node and a second terminal coupled to said second terminal of said generating means; a transforming comprising a primary winding having a first end, and a second end connected to the second terminal of said second switching element, and a secondary winding having a first end, a second end and a central tap connected to ground; a capacitor for coupling the first end of the primary winding to the supply node; a sensing resistor for connecting the second end of the primary winding to said second terminal of said generating means; a first diode for connecting the first end of said secondary winding to an output node; a second diode for connecting the second end of said secondary winding to said output node; and a controller connected to control inputs of said first and second switching elements for alternatively turning on and off said first and second switching elements for inducing an oscillation in an oscillating circuit including at least said capacitor and said primary winding of said transformer, wherein a frequency of said oscillation is inversely proportional to an amount of power being delivered by said resonant mode power supply, characterized in that said resonant mode power supply further comprises a soft-start circuit having means for sweeping the frequency of oscillation from a maximum value to a minimum value, said sweeping means using the function $$f(x)=1-e^{-t}$$

whereby the rate of decrease of the frequency reduces as the amount of power delivered to the output increases and as the output voltage approaches a regulation value.

Applicants have found that overshoot occurs due to the inertia of the feedback circuit in reacting to the output voltage as it reaches the regulation level. Now, instead of sweeping the frequency linearly as has been done in the prior art, the frequency is swept using the function $$f(x)=1-e^{-t}.$$

In using this function, the rate at which the frequency is swept is reduced over time such that the change of the output voltage slows as the output voltage approaches the regulation level. As such, overshoot is lessened, if not eliminated.

Applicants have further noted that the amount of overshoot is dependent on the input voltage, i.e., the higher the input voltage, the greater the amount of overshoot.

The subject invention accounts for this effect, in that said soft-start circuit compensates for variations in a value of said d.c. supply voltage, said sweeping means using the function $f(x)=1-e^{-1/VIN}$, where $V_{IN}$ is the d.c. supply voltage, whereby the function is adjusted based on the input voltage.

Arranged as such, the exponential function with which the frequency is swept is automatically adjusted in dependence on the input voltage.

In order to further control the variation of the frequency so as to prevent overshoot, the subject invention further monitors the variation of the output voltage and slows the rate of change of the frequency if the change in the output voltage exceeds a predetermined value.

This is achieved in that said transformer further comprises an auxiliary winding on which the voltage on said secondary winding is impressed, and said controller comprises an input coupled to said auxiliary winding and means for regulating the oscillation frequency based on a voltage on said auxiliary winding, and wherein said sweeping means comprises a series arrangement of a capacitor and a resistor coupling the auxiliary voltage to ground; and a comparator having a first input coupled to a junction between said capacitor and said resistor, a second input coupled to receive a threshold voltage, and an output coupled to an input of said regulating means.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
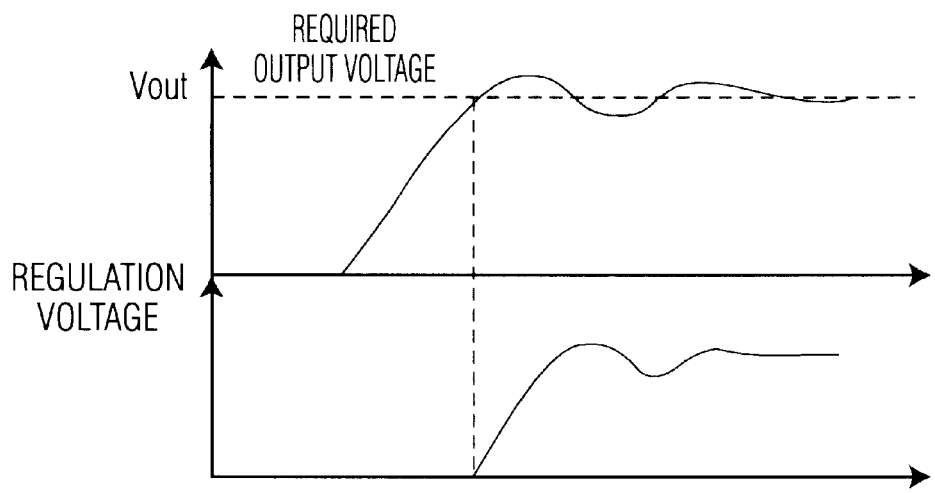
FIG. 1 is a graph showing overshoot of the output voltage upon start-up of a prior art resonant mode power supply.
Figure 2:
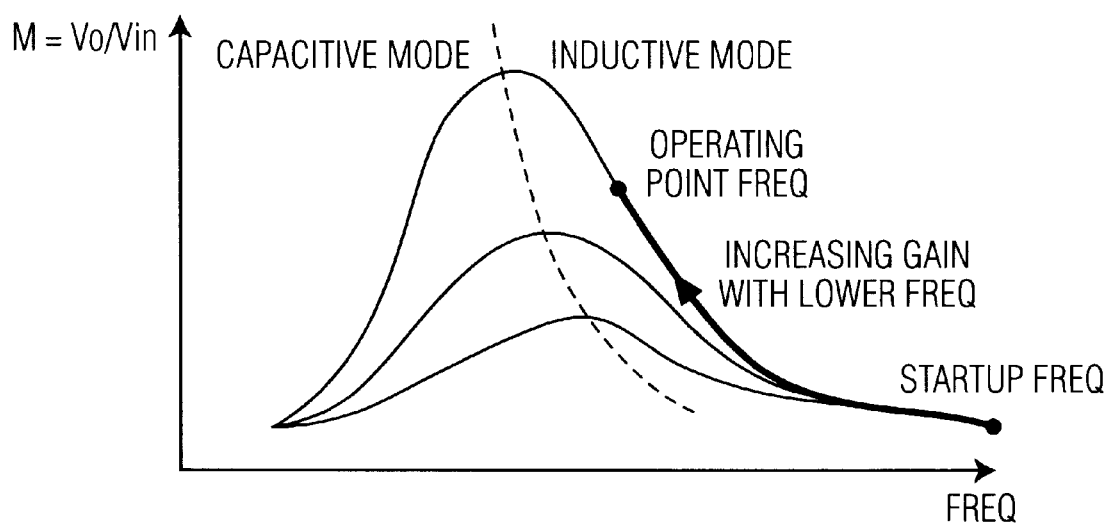
FIG. 2 is a graph showing the gain of a resonant mode power supply close to its operating point.
Figure 3:
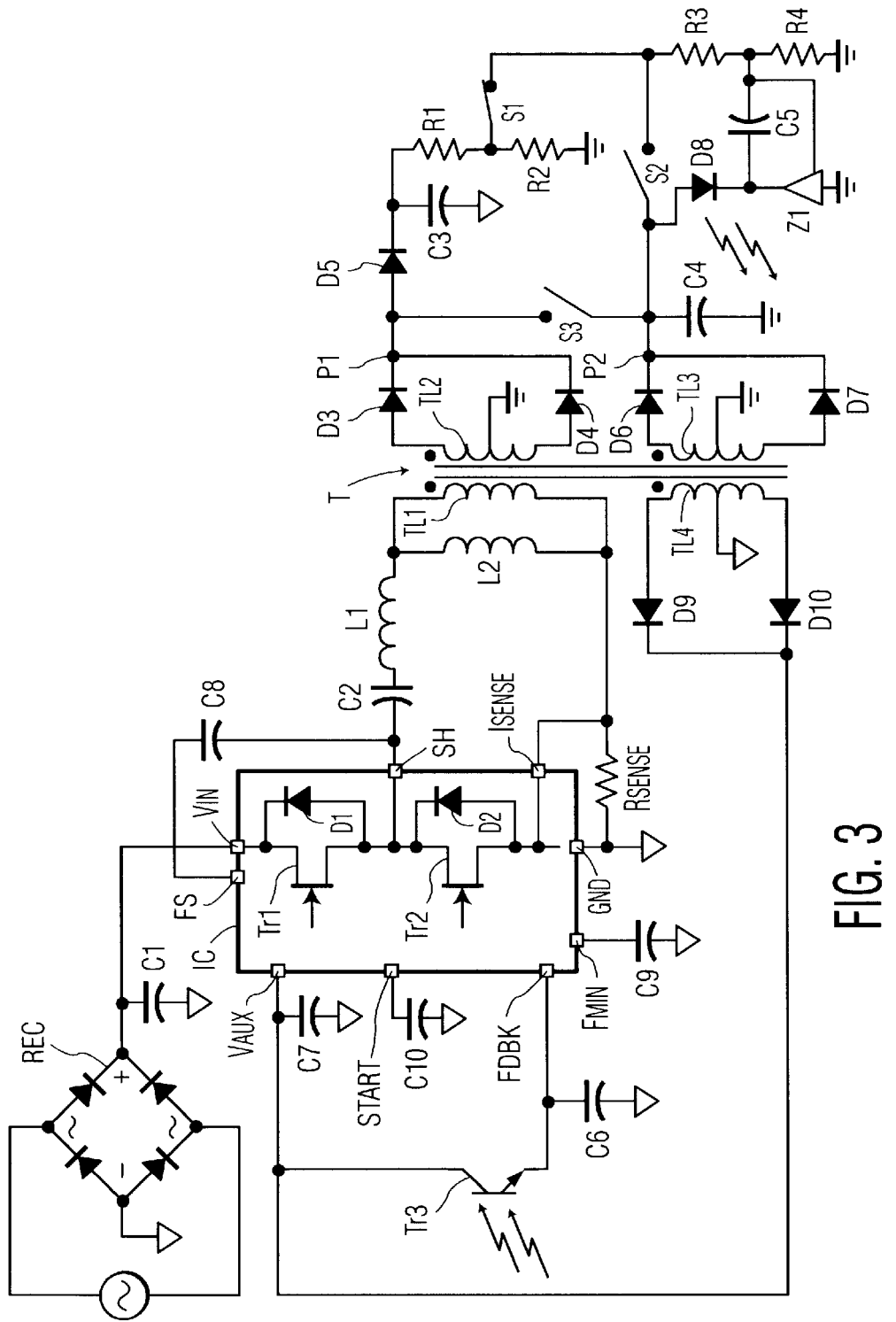
FIG. 3 is a circuit diagram of a known resonant mode power supply.

FIG. 3 shows a block schematic diagram of a resonant mode power supply. Line voltage is applied to a diode rectifier bridge REC forming a d.c. voltage supply. This d.c. voltage is connected to ground via a capacitor C1 and is also connected to ground via a series arrangement of two switching devices Tr1 and Tr2 shunted by diodes D1 and D2, respectively, through a $V_{IN}$ input and ground GND terminal of a controller IC. The junction between the two switching devices Tr1 and Tr2 is connected to a SH output of the controller IC which is connected to ground via a series arrangement of a capacitor C2, a first inductor L1, a second inductor L2 and a resistor $R_{SENSE}$. A primary winding TL1 of a transformer T is connected across the second inductor L2. A first secondary winding TL2 of the transformer T has a center tap connected to ground, and a first and second diode D3 and D4 having their anodes connected to the ends of the first secondary winding TL2 and their cathodes interconnected at a junction point P1. An output diode D5 has its anode connected to the junction point P1 and its cathode connected to ground via an output capacitor C3 and via a series arrangement of two resistors R1 and R2. The output voltage of the resonant mode power supply is taken across the output capacitor C3.

For controlling the power supply, the transformer T has a second secondary winding TL3 which has a center tap connected to ground, and a third and a fourth diode D6 and D7 having their anodes connected to the ends of the second secondary winding TL3 and their cathodes interconnected at a junction point P2. A first switch S1 connects the junction between the resistors R1 and R2 to ground via a series arrangement of two resistors R3 and R4. A second switch S2 connects the resistors R3 and R4 to the junction point P2. A third switch S3 connects the junction point P1 to the junction point P2, which is connected to ground via a capacitor C4. In addition, the junction point P2 is connected to ground via a series arrangement of a light emitter D6 of an opto-coupler and a zener diode Z1 having a control line connected to the junction point between the resistors R3 and R4.

The opto-coupler is used for controlling the regulation voltage of the power supply and further includes a sensor Tr3 for sensing the light output from the light emitter D8. An output from the sensor Tr3 is connected to a feedback (FDBK) input of the controller IC, which is also connected to ground via a resistor R5 and a capacitor C5.

The transformer T further includes an auxiliary winding TL4 for supplying an auxiliary voltage to the controller IC $V_{AUX}$ input via a diode D9. The $V_{AUX}$ input is also connected to ground by a capacitor C6. A capacitor C7 further connects the SH output to a floating source (FS) input of the controller IC. Finally, a capacitor C8 couples a $F_{MIN}$ input of the controller IC to ground, while a capacitor C9 couples a START input of the controller IC to ground.

Figure 4:
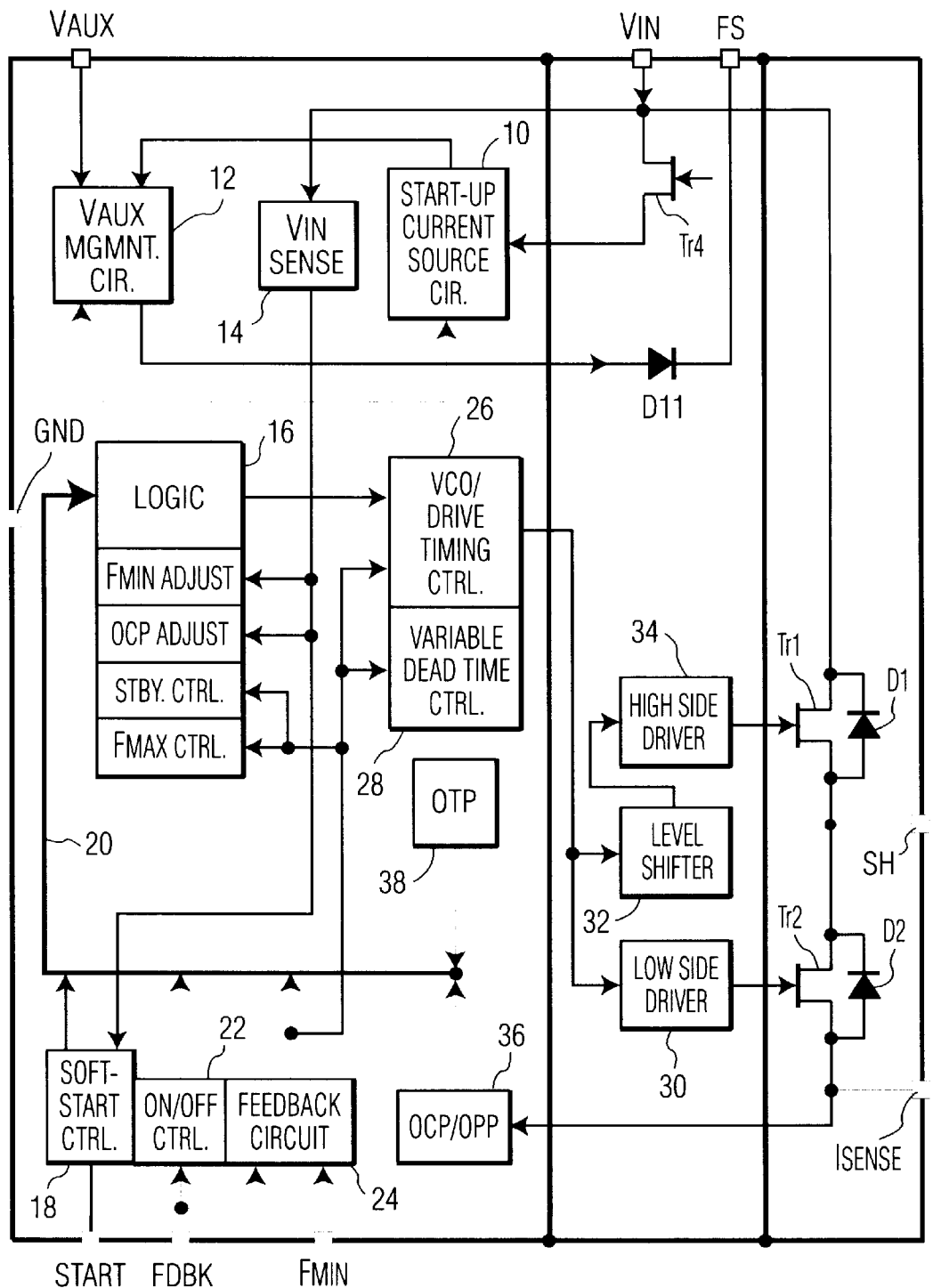
FIG. 4 is a block diagram of a controller for use with the resonant mode power supply of FIG. 3.

FIG. 4 shows a block diagram of the controller IC. The $V_{IN}$ input, in addition to being connected to the switching device Tr1, is connected, through a switching transistor Tr4, to a start-up current source circuit 10 which applies a control signal to a $V_{AUX}$ management circuit 12 which is connected to the $V_{AUX}$ input of the controller IC. An over-voltage protection input of the $V_{AUX}$ management circuit 12 is connected to the FS input via a diode D10. A $V_{IN}$ sensing circuit 14 is also connected to the $V_{IN}$ input and applies a control signal to a $F_{MIN}$ adjust input and an OCP input of a logic circuit 16 and also to a control input of a soft-start controller 18. The soft-start controller 18 is connected to the FDBK input and applies a control signal to the logic circuit 16 via input bus 20. An ON/OFF controller 22 is also connected to the FDBK input and applies a control signal to the logic circuit 16 via the input bus 20. In addition, a feedback circuit 24 is connected to the FDBK input and to the $F_{MIN}$ input and applies another control signal to the logic circuit 16 via the input bus 20, as well as to a stand-by control input and a $F_{MAX}$ input of the logic circuit 16. An output from the logic circuit 16 is connected to a VCO/drive timing controller 26 which also receives the output from the feedback circuit 24. The VCO/drive timing controller 26 has a variable dead-time controller 28 connected to it, which also receives the output from the feedback circuit 24. An output from the VCO/drive timing controller 26 is connected to a low-side driver 30 which controls the switching device Tr2. The output from the VCO/drive timing controller 26 is further applied to a level shifter 32 which applies its output signal to a high-side driver 34 for controlling the switching device Tr1. An over-current/over-power protection circuit 36 is connected to the low side of the switching device Tr2 which is also connected to the ISENSE input of the controller IC. The over-current/over-power protection circuit 36 applies control signals to the logic circuit 16 via the input bus 20. In addition, an over-temperature protection circuit 38 is included and applies a control signal to the logic circuit via the input bus 20.

In operation, under control of the logic circuit 16, the VCO/drive timing controller 26 applies signals to the low-side driver 30 for driving the switching element Tr2, and to the high-side driver 34, through the level shifter 32, for driving the switching element Tr1. The switching elements Tr1 and Tr2 are alternately closed and opened every half oscillation period of the oscillating circuit formed by the capacitor C2, the inductors L1 and L2, and the primary winding TL1, thereby inducing a voltage in the secondary windings TL2 and TL3. The voltage across the primary winding TL1 appears in the auxiliary winding TL4 for controlling the power supply.

The output voltage of the second secondary winding is regulated by the opto-coupler. In particular, the light emitter D8 generates a light output the intensity of which is dependent on the output voltage of the second secondary winding. The light sensor Tr3 detects this light and applies a control signal to the feedback circuit 24 via the FDBK input of the controller IC. Based on this control signal, the oscillation frequency of the power supply is controlled.

Figure 5:
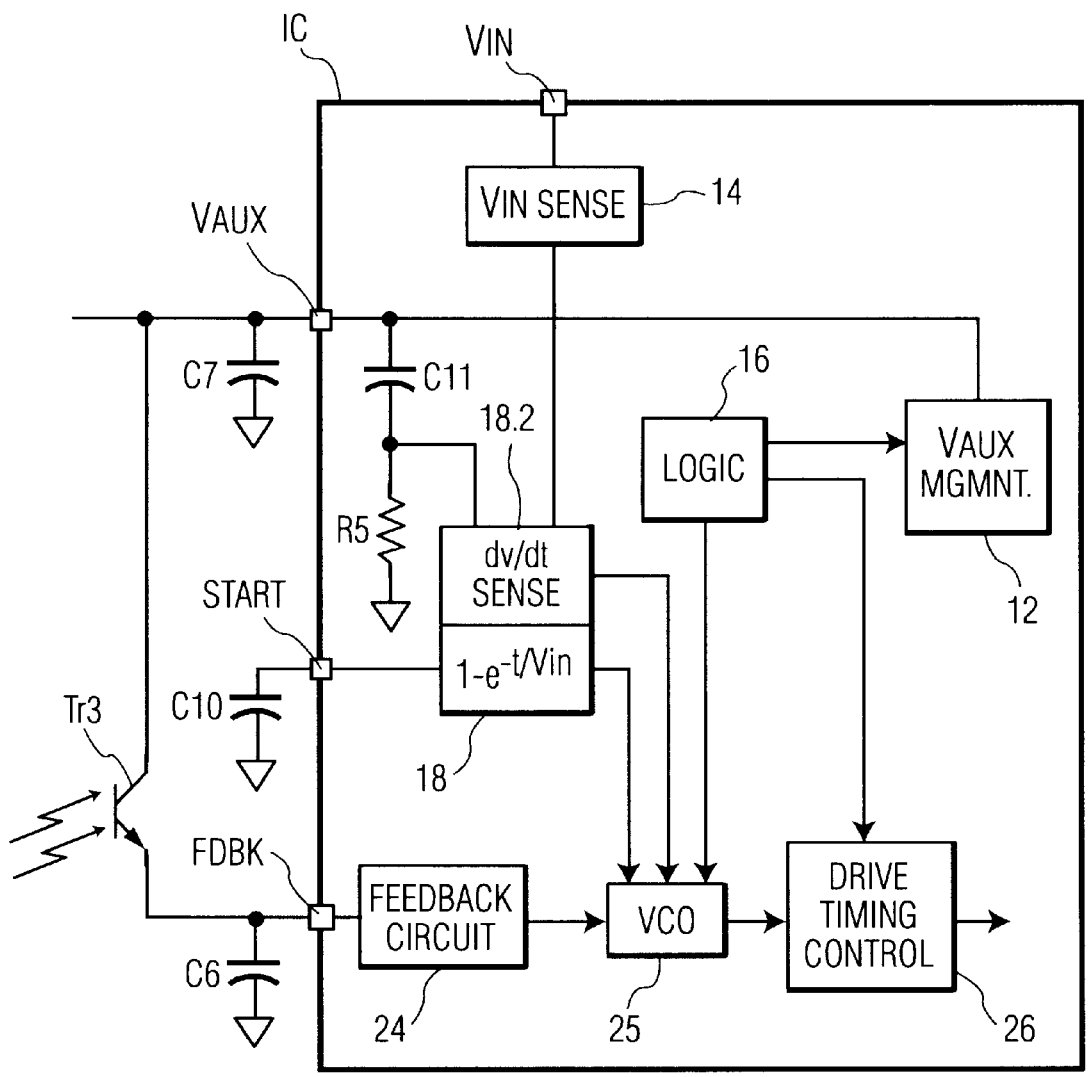
FIG. 5 is a block diagram of a portion of a controller showing the soft-start circuit of the subject invention.

FIG. 5 shows a block diagram of a portion of the controller IC in greater detail. In particular, a voltage-controlled oscillator (VCO) 25 is shown connected to the output of the feedback circuit 24 and to an output of the logic circuit 16. An output from the VCO 25 is connected to an input of the drive timing controller 26. The soft-start circuit 18 includes an exponential function generator 18.1 for generating the function $$F(t)=1-e^{-t/VIN}$$

A first input of the exponential function generator 18.1 is connected to the START input of the controller IC, which is connected to ground by the capacitor C9, and a second input of the exponential function generator 18.1 is connected to the $V_{IN}$ input through the $V_{IN}$ sensing circuit 14. An output of the exponential function generator 18.1 is connected to an input of the VCO 25.

The soft-start circuit 18 further includes a voltage change (dv/dt) sense circuit 18.2 for detecting the change in voltage of the output voltage. To that end, the $V_{AUX}$ input of the controller IC, carrying the $V_{AUX}$ voltage of the auxiliary winding TL4 which is a measure of the output voltage of the first secondary winding TL2, is connected to ground through a series arrangement of a capacitor C10 and a resistor R6. The junction between the capacitor C10 and the resistor R6 is connected to an input of the dv/dt sense circuit 18.2, which has an output coupled to another input of the VCO 25.

Figure 6:
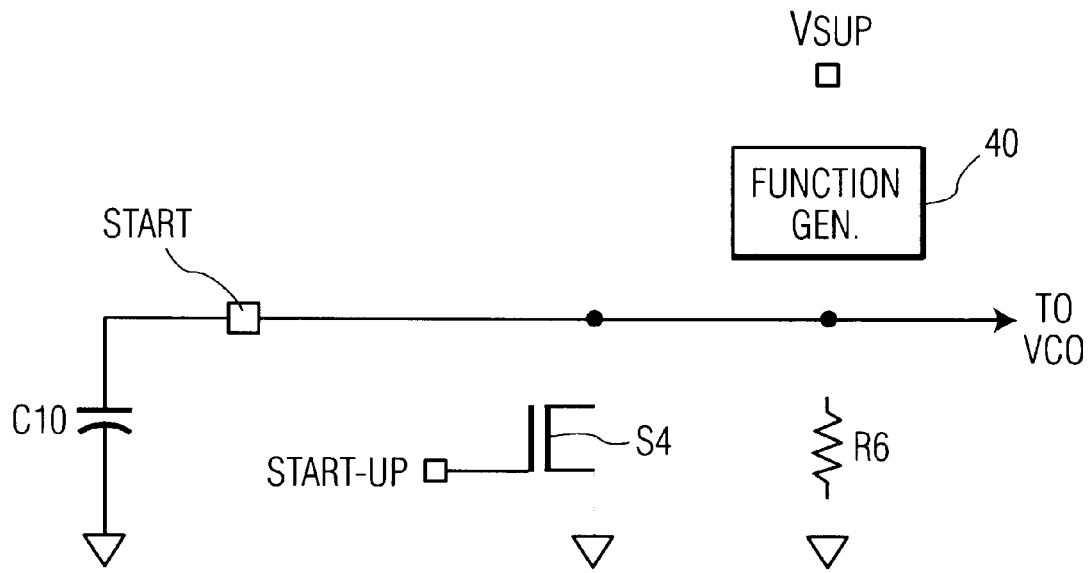
FIG. 6 shows a circuit diagram of a portion of the soft-start circuit.

FIG. 6 shows an embodiment of the exponential function generation 18.1. In particular, the START input of the controller IC is connected to ground via a switch S4 and via a resistor R7. $V_{IN}$ is connected to a function generator 40 for generating the function $1/V_{IN}$. The output from the function generator 40 is applied to the junction of the START input and the resistor R7. This junction also forms the output of the exponential function generator 18.1.

Figure 7:
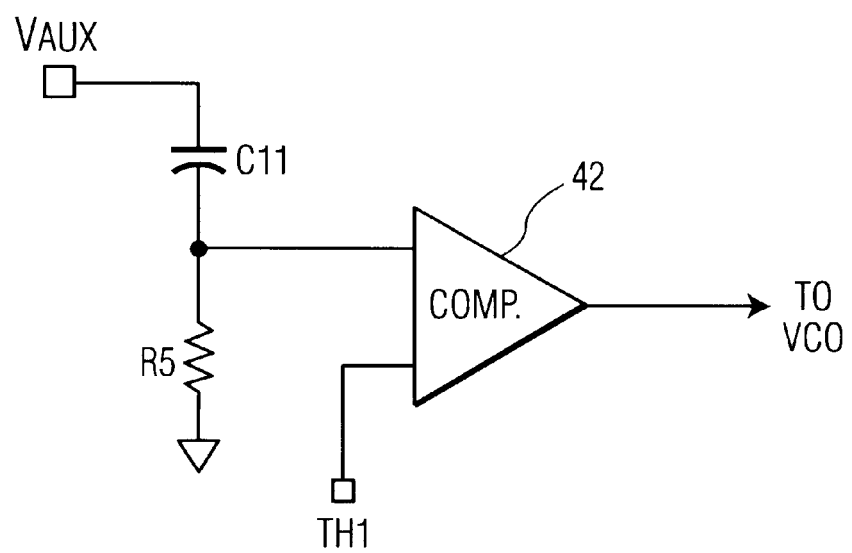
FIG. 7 shows a circuit diagram of another portion of the soft-start circuit.

FIG. 7 shows an embodiment of the dv/dt sense circuit 18.2 which includes a comparator 42 having a first input connected to the junction between the capacitor C10 and the resistor R6, and a second input for receiving a threshold signal TH1. An output of the comparator 42 forms the output of the dv/dt sense circuit 18.2.

Figure 8:
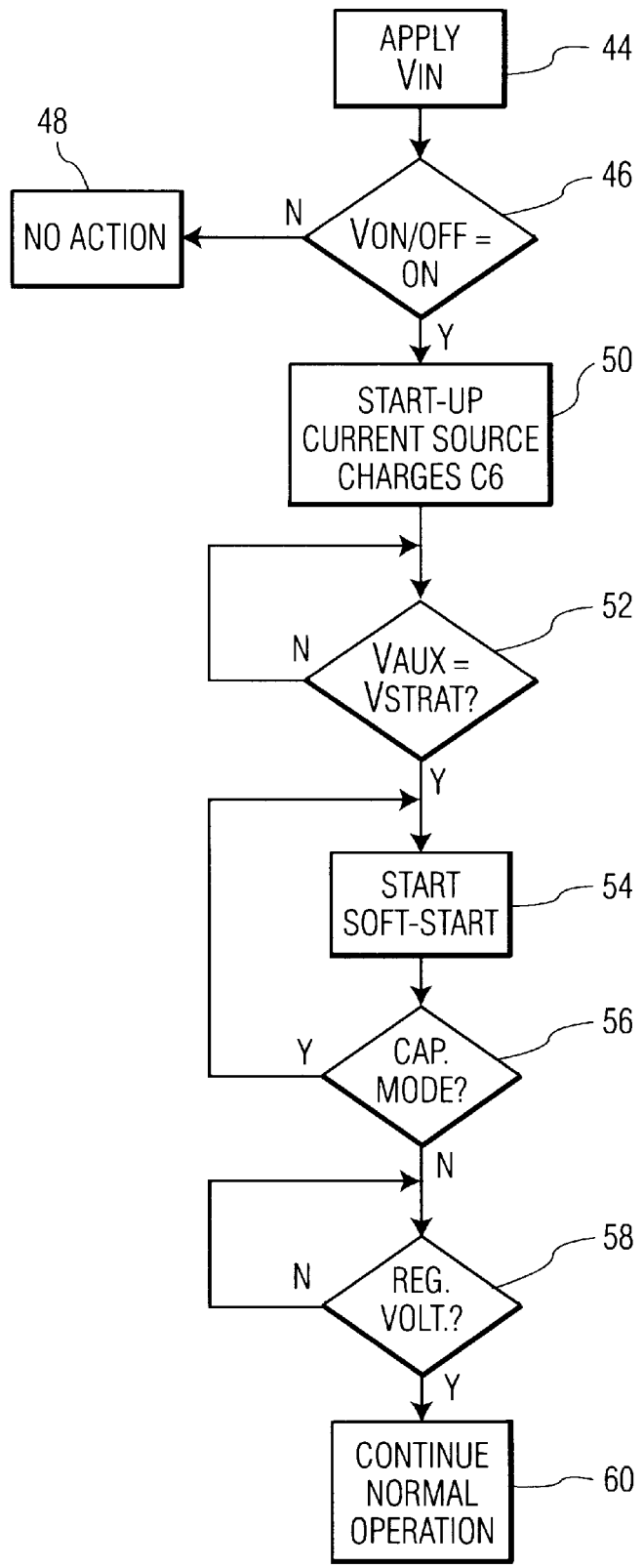
FIG. 8 is a flowchart showing the operation at start-up of the resonant mode power supply incorporating the soft-start circuit of the subject invention.

FIG. 8 shows a flowchart describing the operation of the resonant mode power supply at start up. At block 44, the voltage $V_{IN}$ is applied to the controller IC. It is then detected, at block 46 whether the ON/OFF controller 22 has generated an "ON" signal. If not, no further action is performed (block 48). If the "ON" signal is detected, at block 50, the start-up current source circuit 10 applies a current to the $V_{AUX}$ input of the controller IC to charge the capacitor C6. Once the $V_{AUX}$ voltage reaches the $V_{START}$ level as determined in block 52, the logic circuit 16 signals the soft-start circuit 18 to initiate a soft start. The switch S4 is opened (the switch S4 having been closed to remove any charge on the capacitor C9 and then the exponential function generator 18.1 applies an exponential control signal to the VCO 25, causing a frequency sweep from the maximum to minimum value. Correspondingly, the output voltage across the first secondary winding TL2 increases with the same exponential function. During this time, the dv/dt sensing circuit 18.2 monitors the change in the $V_{AUX}$ voltage and if this change exceeds the threshold level TH1, the dv/dt sensing circuit 18.2 sends a "braking" signal to the VCO 25 further slowing the change in frequency. When the output voltage reaches the desired regulation value and the resonant mode power supply has entered its capacitive mode as determined in block 56, the frequency sweep is terminated and the resonant mode power supply continues in its normal operating mode.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A resonant mode power supply comprising:
   means for generating a d.c. supply voltage having a first terminal and a second terminal;
   a first switching element having a first terminal coupled to said first terminal of said generating means, and a second terminal connected to a supply node;
   a second switching element having a first terminal coupled to said supply node and a second terminal coupled to said second terminal of said generating means;
   a transforming comprising a primary winding having a first end, and a second end connected to the second terminal of said second switching element, and a secondary winding having a first end, a second end and a central tap connected to ground;
   a capacitor for coupling the first end of the primary winding to the supply node;
   a sensing resistor for connecting the second end of the primary winding to said second terminal of said generating means;
   a first diode for connecting the first end of said secondary winding to an output node;
   a second diode for connecting the second end of said secondary winding to said output node; and
   a controller connected to control inputs of said first and second switching elements for alternatively turning on and off said first and second switching elements for inducing an oscillation in an oscillating circuit including at least said capacitor and said primary winding of said transformer, wherein a frequency of said oscillation is inversely proportional to an amount of power being delivered by said resonant mode power supply, characterized in that said resonant mode power supply further comprises a soft-start circuit having means for sweeping the frequency of oscillation from a maximum value to a minimum value, said sweeping means using the function $$f(x)=1-e^{-t}$$

whereby the rate of decrease of the frequency reduces as the amount of power delivered to the output increases and as the output voltage approaches a regulation value.

2. The resonant mode power supply as claimed in claim 1, wherein said soft-start circuit compensates for variations in a value of said d.c. supply voltage, said sweeping means using the function $$f(x)=1-e^{-1/Vin},$$

where Vin is the d.c. supply voltage, whereby the function is adjusted based on the input voltage.

3. The resonant mode power supply as claimed in claim 2, wherein said controller comprises a voltage-controlled oscillator for controlling the switching of said first and second switching elements, and said sweeping means comprises:

an input for receiving a voltage Vsup in accordance with the following formula $$Vsup=1/Vin,$$

Said input being coupled to an output node; and a parallel combination of a resistor and a capacitor coupling said output node to ground, whereby said output node provides a signal having the function $$f(x)=1-e^{-1/Vin},$$

to an input of said voltage-controlled oscillator.

4. The resonant mode power supply as claimed in claim 1, wherein said soft-start circuit monitors the output voltage and regulates the sweeping means based on the output voltage.

5. The resonant mode power supply as claimed in claim 4, wherein said transformer further comprises an auxiliary winding on which the voltage on said secondary winding is impressed, and said controller comprises an input coupled to said auxiliary winding and means for regulating the oscillation frequency based on a voltage on said auxiliary winding, and wherein said sweeping means comprises:

a series arrangement of a capacitor and a resistor coupling the auxiliary voltage to ground; and a comparator having a first input coupled to a junction between said capacitor and said resistor, a second input coupled to receive a threshold voltage, and an output coupled to an input of said regulating means.

* * * * *